Oct. 31, 1933.  C. H. PETERSON ET AL  1,933,447
GUARD CABLE
Filed Dec. 27, 1932
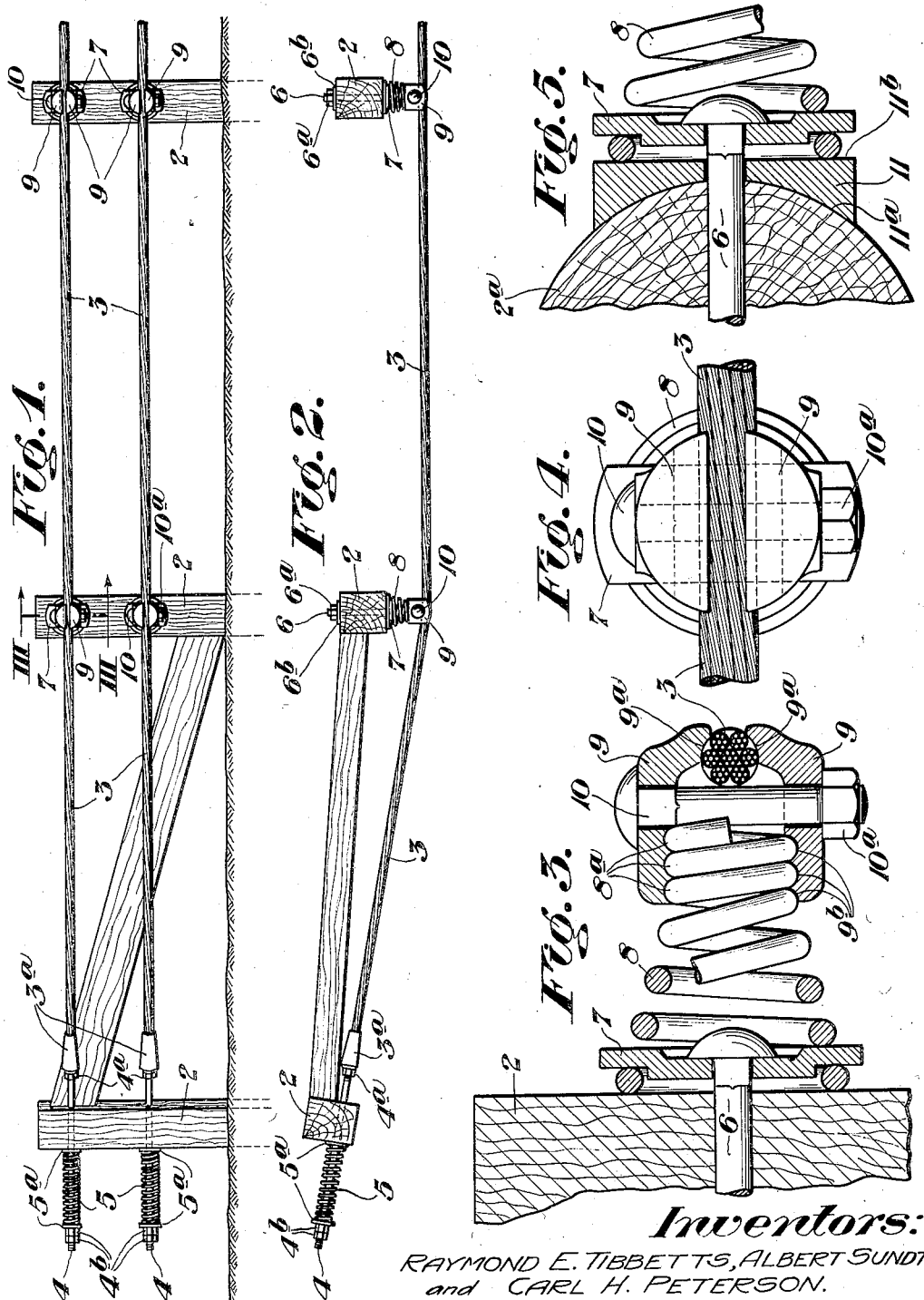
Inventors:
RAYMOND E. TIBBETTS, ALBERT SUNDT
and CARL H. PETERSON.
by:
their Attorneys.

Patented Oct. 31, 1933

1,933,447

UNITED STATES PATENT OFFICE 1,933,447

GUARD CABLE

Carl H. Peterson, Albert Sundt and Raymond E. Tibbetts, Worcester, Mass., assignors to The American Steel and Wire Company of New Jersey, a corporation of New Jersey Application December 27, 1932
Serial No. 649,096

6 Claims. (Cl. 248—31)

This invention relates to improvements in guard cables, and has for one of its objects the provision of a novel resilient cable supporting structure which will readily withstand the many impacts and shocks it will receive in use.

Another object of the invention is to provide a highly efficient structure which will be cheap and easy to manufacture and install.

These and other objects will be apparent after referring to the drawing, in which:

Figure 1 is a side elevation of the invention in use.

Figure 2 is a plan view of Figure 1.

Figure 3 is a sectional view taken on the line III—III of Figure 1.

Figure 4 is an end view of Figure 3.

Figure 5 is a sectional view of a modification of the invention.

Referring more particularly to the drawing, the numeral 2 indicates a plurality of conventional fence posts between which it is desired to place one or more guard cables 3 in order to prevent the passage of mobile objects therethrough. Each of the cables 3 is provided with a terminal 3ª into which there is threaded a rod 4 having associated therewith a lock nut 4ª.

The rod 4 extends through a hole in the end fence post 2 and supports a spring 5 on the other side thereof. Washers 5ª are provided for each end of the spring 5, one in contact with the side of the fence post 2 and the other adjacent the other end of the rod 4, which is threaded to receive the lock nuts 4ᵇ.

Referring to Figure 3, means are provided for supporting each of the cables 3 intermediate its ends. A bolt 6 extends through each of the intermediate fence posts 2 and supports a washer 7 which is disposed between the end convolutions of one end of a spring 8. The bolt 6 is provided with a nut 6ª, and a cooperating washer 6ᵇ, which acts to clamp this end of the spring 8 between the washer 7 and post 2.

The other end of the spring 8 is closely wound, as at 8ª, and is provided with a pair of clamps 9 having cable receiving grooves 9ª and spring receiving grooves 9ᵇ therein. The cable 3 is placed in the grooves 9ª, and the grooves 9ᵇ are placed over the closely wound end 8ª of the spring 8. A bolt 10 and cooperating nut 10ª act to firmly clamp the elements together.

In Figure 5 of the drawing there is disclosed a modified form of the invention for use on round fence posts. In this embodiment a plate 11 is provided with a concave face 11ª for engaging the round fence post 2ª and a flat face 11ᵇ to receive the end of the spring 8.

While we have shown and described several specific embodiments of the invention it will be understood that we do not wish to be limited exactly thereto, since various modifications may be made without departing from the scope of our invention, as defined in the following claims.

We claim:

1. A cable supporting clamp comprising a spring, a washer disposed between the convolutions of one end of said spring, a bolt and nut for said washer, a pair of clamps associated with the other end of said spring, cable receiving grooves in said clamps, and means for compressing said clamps.

2. A cable support comprising a spring, a washer disposed between the convolutions of one end of said spring, means for fastening said washer to a support, a pair of clamps associated with the other end of said spring, cable receiving grooves in said clamps, and means for compressing said clamps on said spring and said cable.

3. A cable support comprising a spring having a closely-wound end, a pair of clamps associated with the closely-wound end of said spring, cable receiving grooves in said clamps, means for compressing said clamps on said cable and the closely-wound end of said spring, a washer disposed between the end convolutions of said spring and means for fastening said washer to a support.

4. A cable support comprising a spring having a closely-wound end, a pair of clamps associated with the closely-wound end of said spring, cable receiving grooves in said clamps, means for compressing said clamps, a washer disposed between the convolutions of the other end of said spring, a plate associated with said washer and means for fastening said plate and said washer to a support.

5. A guard cable support comprising a spring having a closely wound end, a washer disposed between the convolutions of one end of said spring, means for fastening said washer to a support, and means connected to the other end of said spring for holding the cable in supported position.

6. A guard cable support comprising a spring having a closely wound end, a pair of clamps associated with the closely wound end of said spring, cable receiving grooves in said clamps, means for compressing said clamps, a washer disposed between the convolutions of the other end of said spring, a plate having a concaved surface, and means for fastening said washer and said concaved plate to a support.

RAYMOND E. TIBBETTS.
CARL H. PETERSON.
ALBERT SUNDT.